United States Patent
Österling et al.

(10) Patent No.: US 11,849,476 B2
(45) Date of Patent: Dec. 19, 2023

(54) METHOD AND DEVICE FOR CONTROLLING INTERFERENCE IN A RECEIVED SIGNAL WHEN SCHEDULING

(71) Applicant: Telefonaktiebolaget LM Ericsson (publ), Stockholm (SE)

(72) Inventors: Jacob Österling, Järfälla (SE); Henrik Olson, Spånga (SE); Bo Göransson, Sollentuna (SE); Zhanxian Wang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 283 days.

(21) Appl. No.: 17/294,454

(22) PCT Filed: Nov. 16, 2018

(86) PCT No.: PCT/SE2018/051191
§ 371 (c)(1),
(2) Date: May 17, 2021

(87) PCT Pub. No.: WO2020/101549
PCT Pub. Date: May 22, 2020

(65) Prior Publication Data
US 2022/0015115 A1    Jan. 13, 2022

(51) Int. Cl.
*H04W 24/02* (2009.01)
*H04W 72/542* (2023.01)
(Continued)

(52) U.S. Cl.
CPC .......... *H04W 72/542* (2023.01); *H04B 15/02* (2013.01); *H04W 72/569* (2023.01)

(58) Field of Classification Search
CPC ... H04B 15/02; H04W 72/542; H04W 72/569
See application file for complete search history.

(56) References Cited

U.S. PATENT DOCUMENTS 9,693,360 B2    6/2017  Lindoff et al.
11,330,669 B2 *  5/2022  Lee .................. H04W 88/10
(Continued)

FOREIGN PATENT DOCUMENTS

EP    2942993 A1    11/2015
WO   2016082896 A1   6/2016
(Continued)

OTHER PUBLICATIONS

International Search Report and Written Opinion for International Patent Application No. PCT/SE2018/051191, dated Jun. 26, 2019, 9 pages.

*Primary Examiner* — Phuc H Tran
(74) *Attorney, Agent, or Firm* — Withrow & Terranova, PLLC

(57) ABSTRACT

There is provided a method for controlling interference in a received signal when scheduling in a network node for wireless communication with a set of user equipment's, UEs, said set comprising a first UE and at least a second UE, wherein the interference is passive-intermodulation interference, PIM. The method comprises receiving a scheduling request from at least the first UE transmitting on a first frequency and scheduling at least the first UE based on an interference scenario report and available PIM cancellation resources to enable efficient PIM control. The method is performed by a control device.

14 Claims, 10 Drawing Sheets

(51) Int. Cl.
*H04B 15/02* (2006.01)
*H04W 72/566* (2023.01)

(56) References Cited

U.S. PATENT DOCUMENTS

| | | | |
|---|---|---|---|
| 2011/0034192 A1* | 2/2011 | Lim | H04B 7/0639 |
| | | | 455/501 |
| 2022/0256382 A1* | 8/2022 | Kang | H04B 17/336 |
| 2023/0081201 A1* | 3/2023 | Fleischer | H04B 7/0617 |

FOREIGN PATENT DOCUMENTS

| | | | | |
|---|---|---|---|---|
| WO | 2016150501 A1 | 9/2016 | | |
| WO | 2017157461 A1 | 9/2017 | | |
| WO | 2017157464 A1 | 9/2017 | | |
| WO | WO-2017157461 A1 * | 9/2017 | | H04B 15/02 |

* cited by examiner

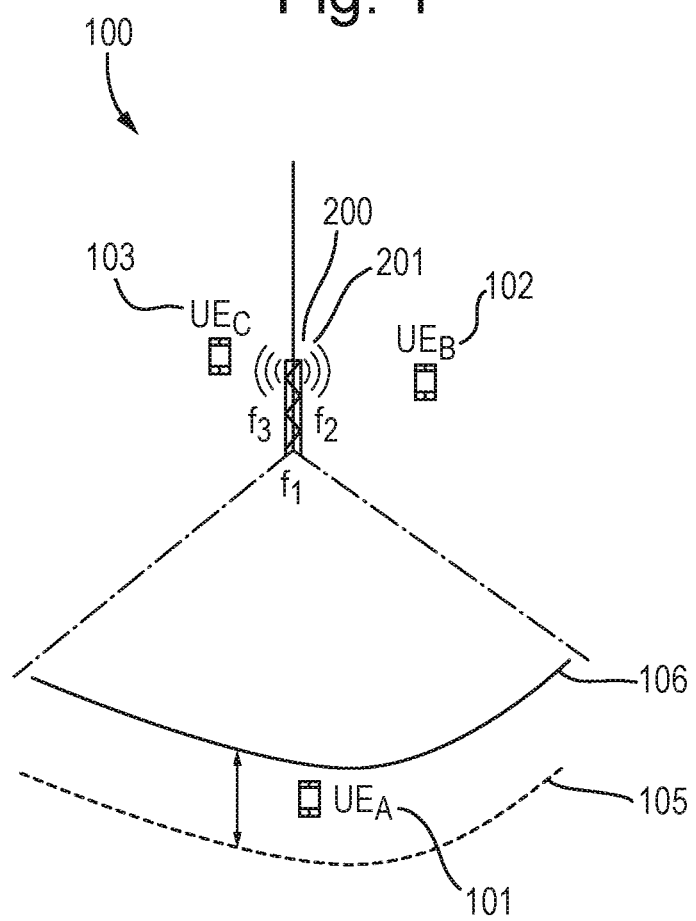

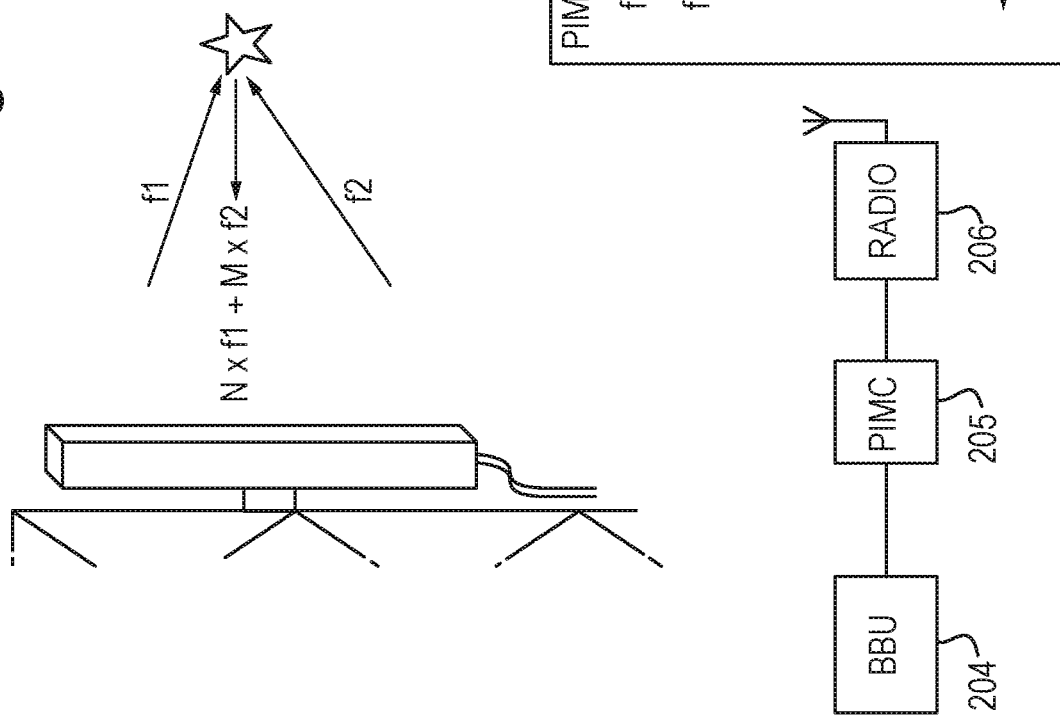

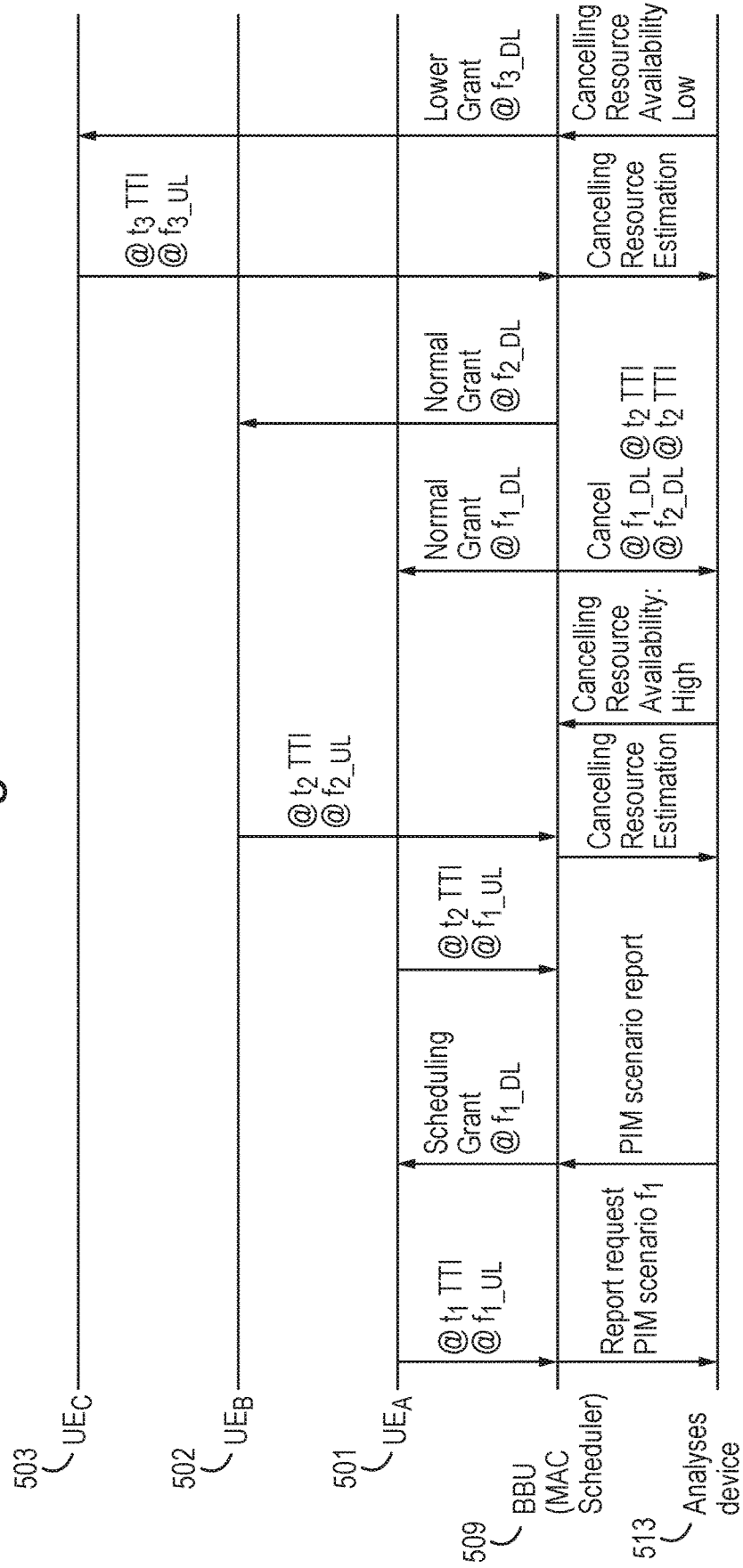

METHOD AND DEVICE FOR CONTROLLING INTERFERENCE IN A RECEIVED SIGNAL WHEN SCHEDULING

This application is a 35 U.S.C. § 371 national phase filing of International Application No. PCT/SE2018/051191, filed Nov. 16, 2018, the disclosure of which is incorporated herein by reference in its entirety.

TECHNICAL FIELD

The proposed technology relates to methods for a network node and a network node site, and a computer program for implementing any of the methods. In particular, the present technology relates to interference caused by passive intermodulation.

BACKGROUND

Passive intermodulation (PIM), is a generic uplink (UL) interference issue for all the network vendors in current systems. The purpose of the transmitter in a digital wireless system is to convert the digital low-frequency baseband signal into a radio frequency (RF) signal while preserving the modulation, and thereby the baseband information. In a frequency division duplex (FDD) system, the radio receives and transmits information simultaneously. Even though the receive and transmit signals are spaced in frequency by the duplex distance, distortion products caused by nonlinearities in the transmitter could fall into the receive band and raise the over-all receiver noise figure. To minimize this effect, external cavity filters are used in radio base stations (RBS) to filter out unwanted components outside wanted transmission band. However, intermodulation products caused by multiple transmitted signals (e.g. own TX in combination with an interferer signal) may also position unwanted tones in the receive band and thus degrade the receiver signal-to-noise-ratio (SNR). Different operators sharing the same site is also becoming more common. However, there is no joint scheduling effort between different operators even though different operators may have a unique pair of spectrums that is separated from each other in the frequency domain. Simultaneous transmission can still happen, which may result in that complex combined transmitter signals falls into the receiver. These signals are not possible to filter out and must be handled by the receiver. One way to solve this is to measure the UL signal and determine which combination of the down link (DL) signal that is returning. This is converted to a set of coefficients in a nonlinear filter which then continuously generate the same signals which are assumed to return. These signals are then subtracted from the received signal, and thereby "cancelling" the PIM, i.e. removing the impact of the PIM before reaching the baseband. A PIM cancellation unit (PIMC) may be inserted in a radio interface where the DL and UL signals are available in digitized format in the time domain. The main problem with this solution is that the PIMC processing increases in amount and complexity with an increased number of frequency bands and antenna branches. A base station supporting many frequency bands can potentially generate a large number of PIM components. This will put high hardware computing requirements on a PIMC algorithm if the worst case should be covered. For a site with a more favorable frequency allocation, and hence less PIM components, the hardware requirements may be much lower.

Hence, there is a need for an improved method to be able to efficiently handle passive intermodulation to save resources.

SUMMARY

It is an object to provide procedures to handle passive intermodulation in a more resource-efficient manner. This and other objects are met by mechanisms performed by a control device for controlling interference in a received signal when scheduling in a network node according to the proposed technology.

According to a first aspect, there is provided a method for controlling interference in a received signal when scheduling in a network node for wireless communication with a set of user equipment's, UEs. The set of user equipment's comprises a first and at least a second UE, wherein the interference is passive-intermodulation interference (PIM). The method comprises receiving a scheduling request from at least said first UE transmitting on a first frequency, and scheduling at least said first UE based on an interference scenario report and available PIM cancellation resources to enable efficient PIM control.

According to a second aspect a there is provided a control device for controlling interference in a received signal when scheduling in a network node for wireless communication with a set of user equipment's, UEs. The set of user equipment's comprises a first and at least a second UE, wherein the interference is passive-intermodulation interference, PIM. The control device comprises processing circuitry being configured to cause the control device to receive a scheduling request from at least said first UE transmitting on a first frequency. The processing circuitry is configured to cause the control device to schedule at least said first UE based on an interference scenario report and available PIM cancellation resources to enable efficient PIM control.

According to a third aspect there is presented an analysis device for reporting an interference scenario, wherein the interference is passive-intermodulation interference, PIM. The analysis device comprises a processing circuitry. The processing circuitry is configured to cause the analysis device to receive a first request for an interference scenario report. The processing circuitry is configured to cause the analysis device to analyze the interference scenario, wherein the interference scenario comprises at least an interfering frequency from a UE. The processing circuitry is configured to cause the analysis device to transmit the interference scenario report, receive a second request about available cancellation resources for PIM cancellation and transmit information about available cancellation resources.

According to a fourth aspect, there is provided a computer program for controlling interference in a network node for wireless communication with a set of user equipment's, UEs. The set of user equipment's comprises a first and at least a second UE, wherein the interference is passive-intermodulation interference, PIM. The computer program comprising computer code which, when run on processing circuitry of a control device, causes the control device to perform the method according to the first aspect.

According to a fifth aspect, there is presented a computer program product comprising a computer program according to the fourth aspect, and a computer readable storage medium on which the computer program is stored. The computer readable storage medium could be a non-transitory computer readable storage medium.

Advantageously this method, these control devices, this computer program and this computer program product enable an efficient way of increasing the signal quality before decoding with less processing and signaling. The method is an effective solution that optimize use of cancellation resources such that memory and bandwidth can be saved.

Other objectives, features and advantages of the enclosed embodiments will be apparent from the following detailed disclosure, from the attached dependent claims as well as from the drawings.

BRIEF DESCRIPTION OF THE DRAWINGS

The embodiments, together with further objects and advantages thereof, may best be understood by making reference to the following description taken together with the accompanying drawings, in which:

FIG. 1 is a schematic diagram illustrating of a communications network according to embodiments;

FIG. 2 is a schematic diagram illustrating how non-linear terms are created and describes an interface according to an embodiment;

FIG. 5 is a flow chart of the involved signaling according to embodiments;

DETAILED DESCRIPTION

Figure 3A:
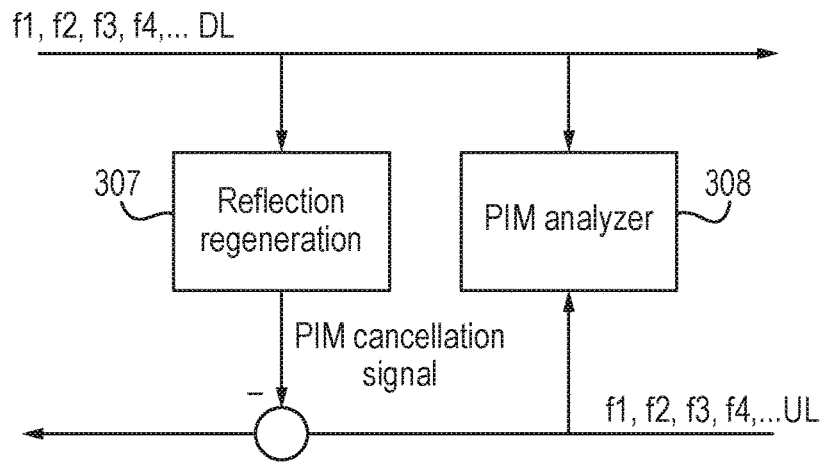
FIG. 3a, FIG. 3b and FIG. 3c are block diagrams illustrating PIM cancellation according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Throughout the drawings, the same reference designations are used for similar or corresponding elements. Any step or feature illustrated by dashed lines should be regarded as optional.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

FIG. 1 illustrates a typical interference problem in a communications network 100. A first $UE_A$ 101 is communicating with the control node of the network node 201. The first $UE_A$ 101 is positioned close to the edge of the cell 105. This $UE_A$ 101 has problems with interference originating from communication with other UEs. In this figure, there are two UEs, $UE_B$ 102 and $UE_C$ 103, which are sending on frequencies that interfere with the frequency of the first $UE_A$ 101. The PIM cause by the transmissions to these UEs affects the UL coverage of the $UE_A$ 101 such that the cell coverage is shrinking from a larger cell coverage 105 to a smaller coverage 106. When the $UE_A$ 101 is so close to the edge of the cell it may lose contact with the network node 201 when the cell coverage shrinks. This problem is solved with embodiments of the present disclosure described further below.

Some examples of network nodes are radio access network nodes, radio base stations, base transceiver stations, Node Bs, evolved Node Bs, g Node Bs, access points, and access nodes, and backhaul nodes. Examples of user equipment's (UEs) or terminal devices are wireless devices, mobile stations, mobile phones, handsets, wireless local loop phones, smartphones, laptop computers, tablet computers, network equipped sensors, network equipped vehicles, and so-called Internet of Things devices.

The control node 200 might comprise, be collocated with, integrated with, or be in operational communications with, an antenna array of the network node 201.

FIG. 2 schematically shows an example of prior art. In this example, a $UE_1$ and $UE_2$ are receiving on frequency f1 and f2 respectively and $UE_3$ is sending on frequency f3. These UEs are not shown in the figure. The DL signals on frequency 1, f1 and frequency 2, f2 are both reflected, and due to the characteristics of the material where the reflection is, nonlinear terms are created N×f1+M×f2, where N and M are integer numbers. The combined reflection of these nonlinear terms may end up as interference in the UL of one of the two frequency bands f1 or f2 or in a third frequency band f3 and become quite disturbing. One way to avoid this interference is to calculate reflections of the signal and then subtract these calculated reflections to cancel out the nonlinear terms in the UL of frequency bands f1, f2 or f3. This may be physically implemented by using a PIM cancellation (PIMC) unit 205 added on a digital interface. An example of a digital interface may be a Common Public Radio Interface (CPRI). In FIG. 2, the PIMC unit 205 is positioned between the base band unit (BBU) 204 and the radio antenna unit 206. DL frequency bands f1 and f2 are fed into a processing block 207 which generates reflections as a PIM cancellation signal, which is then subtracted from the f3 signal in the UL of the UE3.

A more general case is shown of an embodiment in FIG. 3a. This FIG. 3a describes how reflected signals are generated from a set of down link (DL) signals sending on DL frequency bands f1, f2, f3, f4 and applied to received uplink (UL) signals sending on UL frequency bands f1, f2, f3, f4. An analyzing function analyzes the DL signals and received UL signals to determine reflections and their corresponding regeneration coefficients for a subtraction function of the generated reflected signal. This generated reflected signal is then subtracted from the received UL signal on the UL frequency band.

FIG. 3a describes feeding a set of DL signals on DL frequency bands f1, f2, f3, f4 through a reflection generation unit 307. The subtraction function inputs the received UL signals on the UL frequency bands together with outputs from the reflection generation unit 307. The PIM analyzer 308 analyses the DL signals and the received UL signals to determine reflections and their corresponding regeneration coefficients.

Figure 3B:
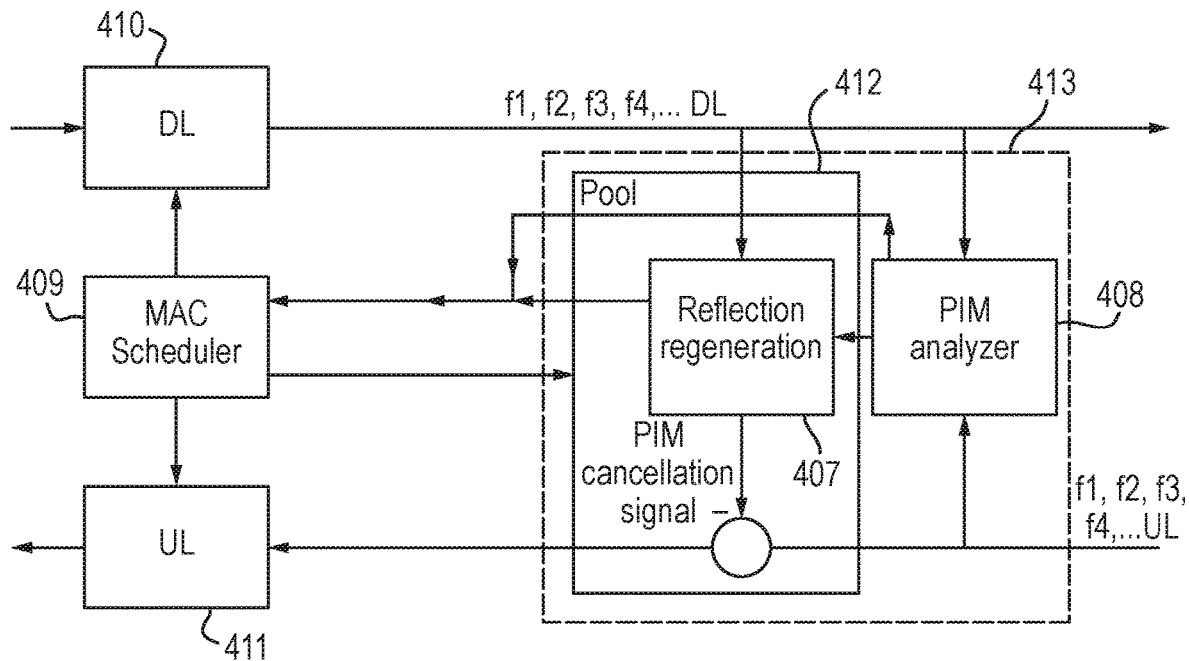

With reference to FIG. 3b, a preferred embodiment is presented. This figure describes as in FIG. 3a how reflected signals are generated from a set of DL signals on DL frequency bands f1, f2, f3, f4 and applied to received UL signals on UL frequency bands f1, f2, f3, f4. An analyzing function analyzes the DL and UL frequency bands to determine corresponding regeneration coefficients of a subtraction function of the generated reflected signal. This signal is then subtracted from the received UL signal of the UL frequency band to remove the generated reflected signal from the received UL signal of the UL frequency band. Further there is a scheduling function informing a DL data plane comprising the DL signals with the DL frequency bands and a UL data plane comprising the UL signals with the UL frequency bands about UEs to transmit to and receive from, including which physical layer resources the data is transmitted on. These "physical layer resources" may e.g. be a number of subcarriers for a time slot and may be the smallest element of resource allocation assigned by a scheduler. One example of a physical layer resource is a PRB as used in 4G, but it may as well be a similar resource as used in 3G or 5G. The scheduling function also states which signal to regenerate. This can be done explicitly by informing which physical layer resources are used in both DL and UL for the coming transmit time interval (TTI) and by that which PIM product to calculate and cancel and e.g. suggest what UL physical layer resources are prioritized to cancel DL PIM on, and which DL physical layer resources are occupied. When the DL physical layer resources are occupied, the reflection regeneration function can determine which signals are worth regenerating. Since the traffic load is seldom 100% in DL and UL, the actual needed interference cancellation resources are much lower than the maximum needed resources, but it may vary over time.

The scheduling function is aware of the cancellation resource capacity and the PIM interference scenario situation e.g. which parts of the frequency bands that affect each other and can then optimize the scheduling based on this and the number of cancellation resources available. It can determine how to best place DL traffic to get the best UL performance for the coverage challenged UL UEs.

The analyzer function is typically responsible for detecting PIM in the UL whenever there is DL traffic scheduled. Also, the analyzer works as a function to analyze the PIM scenario within the site.

In an implementation example of FIG. 3b, a set of DL signals on DL frequency bands f1, f2, f3, f4 are fed through a reflection generation unit 407, which calculates a subtraction function that removes the generated signal from the received UL signal in the UL frequency band. The unit 407 is positioned in a PIMC pool 412. Thus, the function of the PIMC pool is to generate a correction signal in the reflection generation unit 407 using the corresponding regeneration coefficients and feed it to the subtraction unit (also called the PIM cancellation signal). The PIMC pool 412 is also aware of the number of available cancellation resources. Further, in FIG. 3b, there is an PIM Analyzer 408 shown as the analyzer function, which measures on the DL and the UL and calculates PIM sources, i.e. the characteristics of the reflections from the DL to the UL. The PIM Analyzer 408 sends this information (as a source model) to the scheduling function which may be for example a Media Access Control (MAC) scheduler 409 and to the reflection generator unit 407. The PIM Analyzer 408 is placed where it is because it should have access to the untouched received UL signal. Moreover, there is a PIM Cancellation (PIMC) pool 412 comprising of the reflection generator unit 407 and the subtraction unit. The reflection generator unit 407 generates the same combined signal as the PIM source does, and the subtraction unit subtracts this signal from the received UL signal. A model of the reflection generator unit 407 is sent to a MAC Scheduler 409. The MAC Scheduler 409 makes the decisions on the frequency allocation for UE transmissions.

The PIM analyzer 408 may be positioned as an external unit outside of the PIMC pool 412 or as an internal unit inside the pool. The PIM analyzer 408 and the PIMC pool 412 may also both be positioned in the network node. In the following, the term analysis device 413 will be used and comprises both the PIM analyzer 408 and the PIMC pool 412. The MAC Scheduler 409 informs the DL data plane 410 and UL data plane 411 about UEs to transmit to and receive from, including which physical layer resources the data is transmitted on. The MAC scheduler 409 also states which signal to regenerate by the reflection regeneration unit 407 or the PIMC pool 412. The MAC scheduler 409 sends a request to get information of the PIMC pool capacity and the PIM interference scenario situation e.g. which parts of the frequency bands that affect each other and can then determine how to best place DL traffic to get the best UL performance for the UL coverage challenged UEs.

An exemplary data flow for transmission to the UE now becomes: Data to be transmitted is received by the network node and stored by the DL data plane 410. The data is stored by the DL data plane 410 for two reasons: to await the proper transmission time to the UE in case immediate air interface resources are not available, and to allow for retransmissions if reception fails once transmitted over the air. The DL data plane 410 informs the MAC scheduler 409 about data in its buffers. The MAC scheduler 409 decides which UEs to transmit to, and how. The MAC scheduler can also use the information on stored data, changes in stored data and amount being scheduled for transmissions in each TTI, to predict transmission needs the coming few TTIs. The DL data plane 410 reports on stored data for transmission thus contain information on pending transmissions.

When the MAC scheduler 409 makes a decision to allocate certain physical layer resources, this allocation may create a PIM signal in the UL frequency band. The PIM analysis device 413 should then have the needed resources available to cancel this PIM.

Figure 3C:
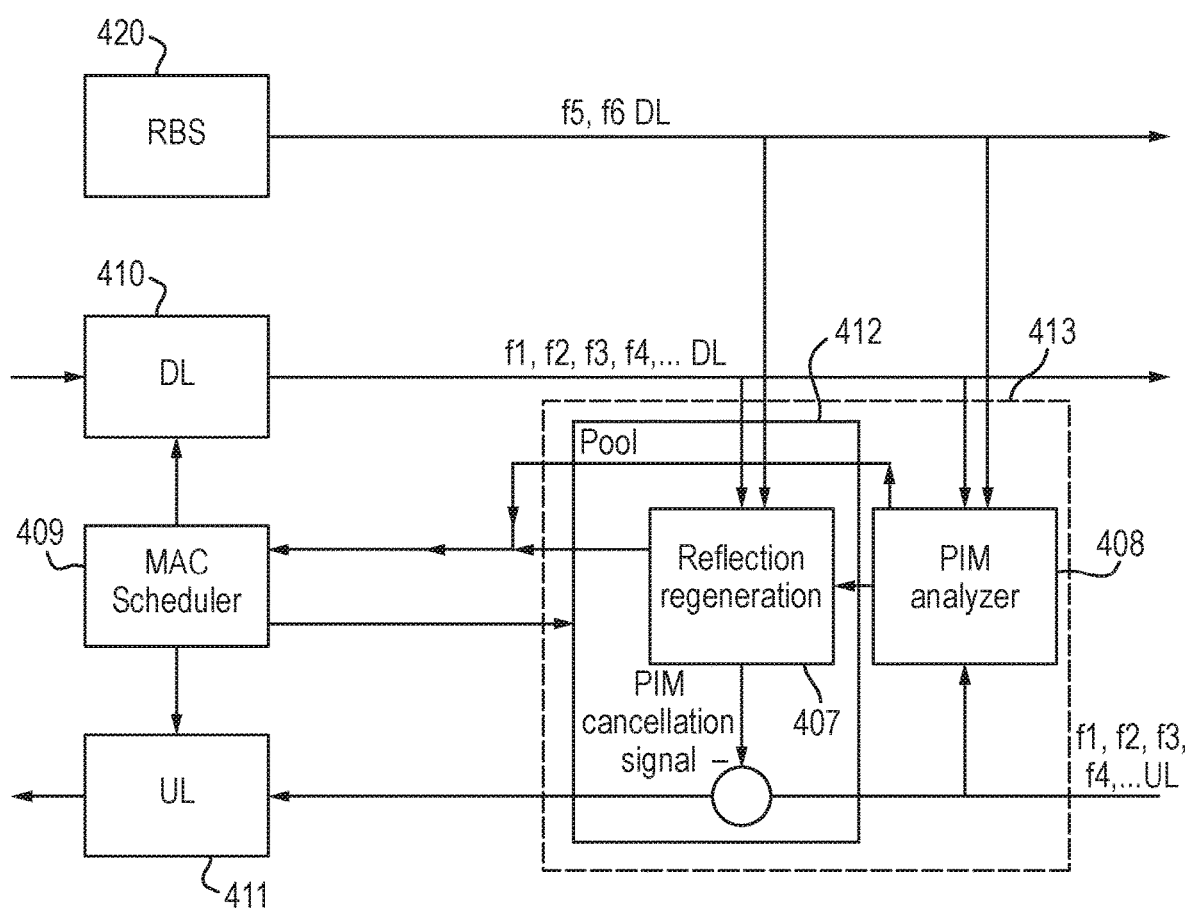

In FIG. 3c, another preferred embodiment is described. In this FIG. 3c, a Radio Base Station (RBS) 420 is also transmitting signals in the same antenna system as in FIG. 3b, making its DL signals on DL frequency bands f5 and f6 a potential aggressor to the UL received signals of the network node. The DL signals of RBS 420 are input both to the PIM Analyzer 408 and the Reflection Regenerator 407. Optionally, but not shown in FIG. 3c, also the UL signals of the Radio Base Station 420 can be fed through the PIM Analysis device 413 for PIM cancellation. Since the MAC Scheduler 409 cannot control the DL transmissions of the RBS 420, its primary way to reduce UL interference is to allocate cancellation resources when needed. The PIM Analyzer 408 informs the MAC Scheduler 409 both about the PIM impact (PIM interference scenario) of the RBS 420 DL transmissions and about the current DL power transmitted by the RBS 420. By that, the MAC Scheduler can obtain a prediction of the UL interference level caused by the RBS 420 for a coming UL reception. The PIM can be a combination of the RBS 420 DL transmission and a DL transmission by the network node itself. In such case, the MAC Scheduler can also impact the UL interference level by omitting its own transmission.

Figure 4A:
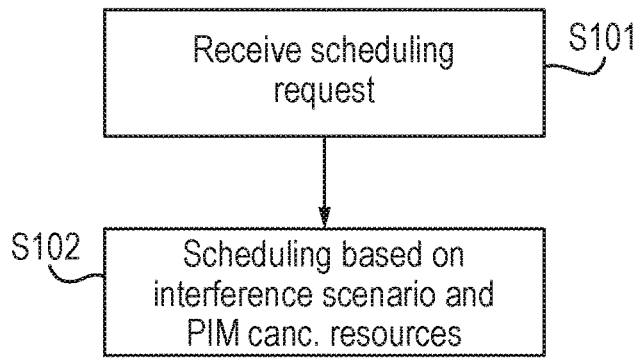
FIG. 4a and FIG. 4b are flow charts of methods according to an embodiment.
Figure 4B:
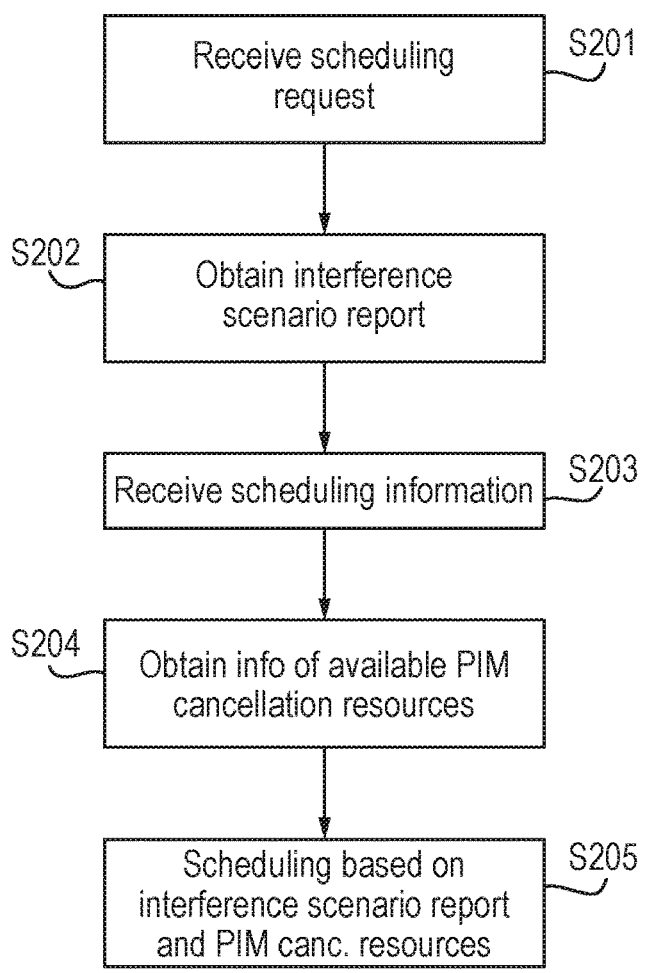

FIG. 4a and FIG. 4b are flowcharts illustrating preferred embodiments for controlling interference in a received signal when scheduling in a network node with a set of user equipment's. The set of user equipment's comprises a first and at least a second UE. The interference is passive-intermodulation interference, PIM. The methods are performed by the control device 200 (herein also sometimes called a control node) and are advantageously provided as computer programs 920. Thus, the method controls the interference level in a received signal e.g. reduce the interference in the received band or cancelling interference before detection.

S201, S101: The control node 200 receives a scheduling request from at least a first UE transmitting on a first frequency.

S205, S102: The control node 200 then schedules at least the first UE based on an interference scenario report and available PIM cancellation resources to enable efficient PIM control. This interference scenario may include interference frequencies affecting the first UE from communication with other UEs but may also include interference from the same UE.

In this respect the UE sends as an UL transmission a request to the control node 200 that is positioned in the network node for scheduling during a first-time interval t1 of a transmit time interval (TTI). It may for example be sent to the MAC scheduler in the control node. Alternatively, it may be sent to another unit in the control node 200. This UE has problems with interference impact in the UL coverage from e.g. passive intermodulation products caused from DL traffic.

S202: The control node 200 obtains the interference scenario by transmitting a first request to an analysis device 413, 408 for the interference scenario report and then receives the interference scenario report from said analysis device.

S203: The control node 200 further schedule the at least first UE based on the scheduling information received from the at least first UE. The scheduling information may comprise one or more frequency dependent information. The scheduling information may comprise one or more of channel quality information (CQI), Modulation and Coding Scheme (MCS), Buffer Status Report (BSR) and Quality of Service Class Indicator (QCI). Thus, either of these may be frequency dependent.

S204: The control node 200 obtains available PIM cancellation resources by transmitting a second request to the PIM cancellation device 412, 413 about available interference cancellation resources and receives information from said PIM cancellation device about available interference cancellation resources.

This method provides an efficient way of using the cancellation resources to cancel PIM and improving the performance of the system.

The analysis device is reporting the interference scenario. The device receives a first request from the network node for an interference scenario report and then transmits the interference scenario report about at least one interference frequency from a UE. Further it receives a second request about available cancellation resources for PIM cancellation and transmit such information about available PIM cancellation resources. This may be sent and received by a PIM cancellation device 412 (PIMC Pool) in the analysis device 413. The first request may be received and responded to during a first-time interval and the second request may be received and responded to during a second-time interval. However, in some cases it may also send first and second requests and receive responses during the same time interval. The interference scenario report comprises information of interference impacting at least one planned coinciding UL transmission of said at least first UE. This may be during DL scheduling. The interference scenario report may also comprise information of interference impacting at least one planned coinciding DL transmission. This may be during UL scheduling. The interference impacting the at least one planned coinciding UL is caused by transmitting in DL to at least a second UE transmitting on a second frequency band.

In the following, different embodiments are described for controlling interference in the control node 200, when scheduling at least one DL or at least one UL transmission.

When scheduling at least one DL transmission, the control node 200 is configured to determine, if there is interference caused by at least one DL transmission impacting the at least one coinciding UL transmission and if any cancellation resources are available.

If there is interference and interference cancellation resources are available, the control node 200 is configured to allocate cancellation resources for said UL transmission. If there are no cancellation resources available, the control node examines and compares the priority of the at least one DL transmission with the at least one UL transmission. If there are no cancellation resources available and if the priority of the at least one DL transmission is examined (or determined) to be higher than the at least one UL transmission, the control node 200 is configured to schedule DL transmissions. If the priority of the at least one DL transmission is lower than the at least one UL transmission, the control node 200 is configured to postpone the DL transmission or transmit information in the DL with reduced quality. However, it may also decide to only schedule common channels if the priority of the at least one DL transmission is lower than the at least one UL transmission. Reduced quality may herein mean reduced power, signal quality or SINR. Thus, the DL transmission then provides less interference impact on the UL transmission.

In an alternative embodiment, if the control node 200 determines that there are interference cancellation resources available or not, the control node 200 may test multiple different frequency allocations for the DL transmission to determine the frequency allocation requiring the least amount of cancellation resources. An exemplary embodiment is that the control node 200 maintains a model of the PIM sources and the PIM cancellation resource pool 412, obtained from the PIM analysis function 413, and iterate DL frequency allocations to optimize the total cell throughput before communicating a PIM cancellation resource request to the PIM analysis function 413.

The term "coinciding" herein means occurring or starting at the same time of a time interval. A coinciding DL transmission impacting during a UL transmission herein means a DL transmission of information that occur at the same time as during a UL transmission of information.

With reference to FIG. 10 a, b, c, and d, some preferred embodiments are illustrated describing examples of UL scheduling. In these FIGS. 10 a-d, the noise and interference power level 1010 are shown for an UL frequency band, as a function of frequency.

Figure 10A:
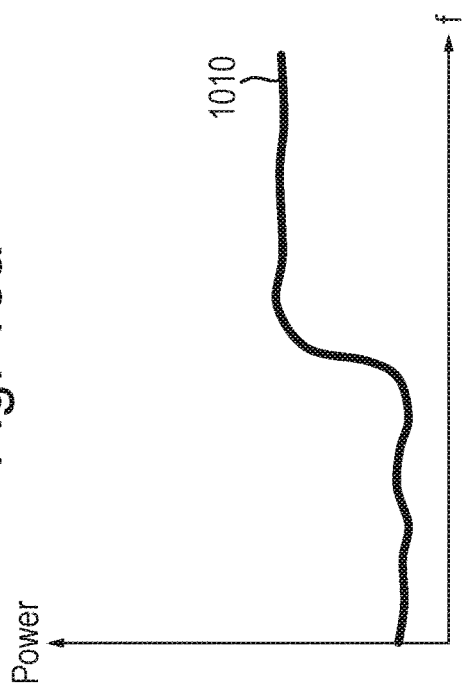
FIG. 10a-d are graphs illustrating noise and interference power levels according to an embodiment.

In FIG. 10a, the lower part of the UL frequency band has low noise and interference power level, whereas the high part of the UL frequency band has high noise and interference power level, caused by PIM interference being added to that part of the frequency band.

Figure 10B:
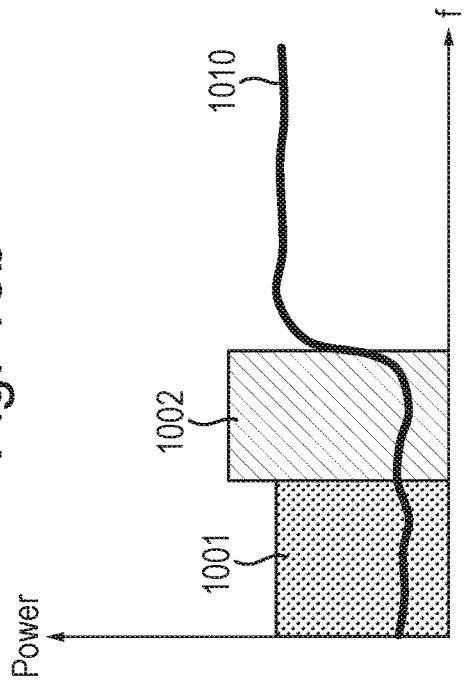

In FIG. 10b, the MAC Scheduler 409 has decided which parts of the frequency band 1001 and 1002, to schedule two UEs for UL transmissions. The UEs are placed on the part of the spectrum with the least noise and interference, to allow for error free transmissions. The power level of the UEs are indicated at the demodulator of the receiver in the UL user plane function 411 and are shown to be well above the noise and interference level 1010. The amount of spectrum allocated for each UE is determined by link adaptation function in the MAC Scheduler 409 and is based on the amount of data to be transferred and the achievable signal quality or power level e.g. SINR. When more UEs are requesting data transmissions than possible with the resources available, the Quality of Service (QoS) of each UE is used to determine the amount of resources allocated for the UE.

Figure 10C:
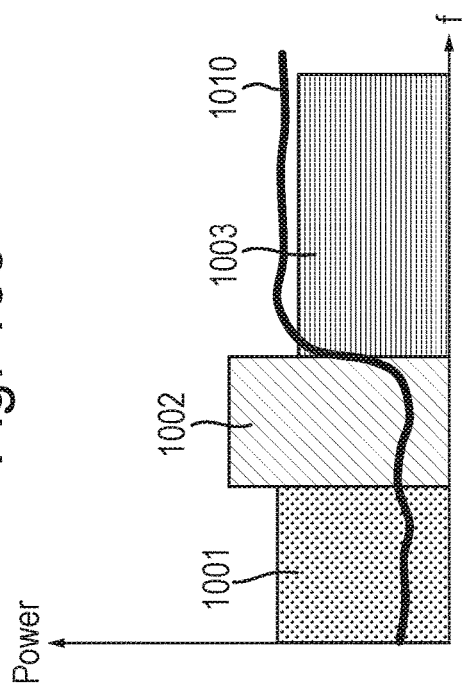
Figure 10D:
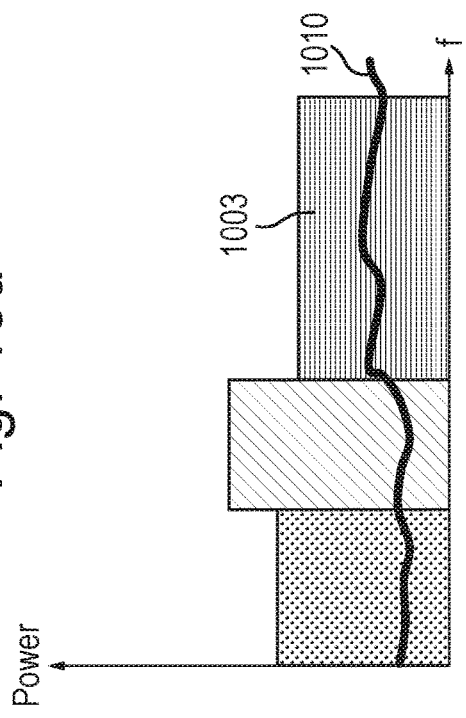

In FIG. 10*c*, the MAC Scheduler attempts to schedule a third UE, and the candidate allocation is shown as 1003. The received UL signal for UE transmission 1003 will be well below the interference and noise level 1010 and will not be successful. The MAC Scheduler will then request PIM cancellation resources from the PIM Pool 412, resulting in a changed interference and noise level 1010 as indicated in the FIG. 10*d*. The signal power level for UL allocation 1003 is now sufficient for the successful transfer. The method includes the MAC Scheduler 409 predicting the interference and noise level 1010. The noise level part is achieved by averaging the UL signal power level over multiple TTIs. The interference level caused by PIM needs to be predicted for each TTI to schedule. The model to transfer DL signals to UL interference is received from the PIM Analyzer 408. For DL signals originating from its own network node, the MAC scheduler 409 can predict the DL signal power level by examining the amount of data buffered for transmission in the DL function 410, and history about corresponding previous DL signal power level at similar buffer status.

For DL signals originating from its own network node, or from a co-sited RBS but still fed into the PIM Analysis function 413, the MAC Scheduler 409 can obtain information about DL signal power levels and recent statistics on DL signal power levels and based on this predict the DL signal power level for the UL TTI being scheduled.

The PIM Analyzer 408 builds a model for the DL signal strength. The first step in the model is to determine the DL Radio Access Network (RAN) type, especially if it is Global System for Mobile Communication (GSM), Wideband Code Division Multiple Access (WCDMA), Long-Term Evolution (LTE) or New Radio (NR). For GSM, the DL signal typically repeats every 4.6 ms, the GSM frame length, and this knowledge is used to predict the DL signal power level; the power level is assumed to be the same as for 4.6 ms ago. For WCDMA, the DL signal is constituted both of continuous transmissions and burst transmissions. The PIM Analyzer 408 creates a model for both the continuous level and the bursty part (average level and distribution). The model is based on approximately 100 ms history (uses the last 100 ms of measurements). For LTE and NR, the DL signal is almost only bursty, so the PIM Analyzer 408 creates only a burst description model (average level and distribution). The model is based on approximately 100 ms history.

The prediction is made latest in the TTI where the scheduling for the UL UE transmission is made, which for LTE with 1 ms TTIs is 4 ms before the UL transmission, i.e. the prediction is done for 4 ms to 5 ms ahead.

Further, the interference scenario report may comprise an indication. If that indication indicates that the predicted DL generated PIM interference in the UL is prohibiting the first UE during UL transmission to reach a sufficient signal power level according to its Quality of Service (QoS) requirements, the scheduler will request PIMC resources. The predicted DL generated PIM interference in the UL may be based on the measured PIM interference level in the previously transmitted time intervals (TTIs), where the measuring is performed by the PIM Analyzer 408. Alternatively, the predicted DL generated PIM interference in the UL may be based on the predicted DL signal power level and previously measured PIM at similar power level, where the predicted DL signal power level is based on information on pending transmissions from the DL user plane.

It is appreciated that DL generated PIM interference in the UL herein means a PIM interference originating from the DL transmission disturbing as interference in the UL. It is also appreciated that the term signal quality level which is also called signal power level may herein mean e.g. a signal to noise and interference ratio (SINR) or a signal to noise ratio (SNR) level.

Hence, the present disclosure describes a solution that has the benefit to choose using either different avoidance strategies or interference cancellation to optimize use of resources and reducing the complexity for systems.

In an example embodiment, using PRBs as a typical example of physical layer resources, if we assume 30% traffic load over Physical Resource Blocks (PRBs), and a PIM generated by 2 frequency bands, we get a $0.3^2$ probability to create a PIM product, and maybe 30% probability to have this impacting the UL traffic. Thus, we get $0.3^3=3\%$ probability. By having a PIMC pool which has a 3% probability of receiving impacting interference compared to a max case, we can likely cancel out almost all practical cases. However, this situation may vary from transmit time interval (TTI) to TTI, so we need to have this under control at the network node e.g. by the MAC scheduler. Thus, using a cost-efficient PIM cancellation as described in this disclosure reduces the complexity and provides a better capacity.

FIG. 5 shows a flow chart of an involved signaling of another preferred embodiment. The time is along the horizontal line and the different units are in the vertical line. The MAC scheduler 509 receives a scheduling request (SR) through air-interface at the first transmit time interval $t_1$ TTI from the first $UE_A$ 501 which is the $UE_A$ that receives interference impact from intermodulation products in the DL traffic affecting the UL coverage of the $UE_A$. The MAC scheduler 509 which may be physically implemented in the baseband unit (BBU) of the network node will request the analysis device 513 for existing known PIM interference scenario analysis. The analysis device 513 can be either implemented in the same baseband hardware unit or communicate with the baseband unit through an interface. Further, since as long as the frequencies of the configured network are known, e.g. f1, the interfering frequencies to the $UE_A$ 501 are known e.g. f2 from $UE_B$ 502 and/or f3 from $UE_C$ 503. With this information on potential PIM problems, and the scheduling information (CQI, MCS, BSR & QCI), the MAC scheduler 509 sends a request to the analysis device 513 or specifically to the PIM cancellation device in the analysis device 513 regarding available cancellation resources.

With all this information, the MAC scheduler 509 can then decide on a suitable scheduling strategy. The scheduling strategy may then also depend on the signal quality level (as e.g. Signal to Interference and Noise Ratio (SINR)) requirements of the UL transmission as well as of available PIMC resources. In a case when there are few PIMC resources available, the MAC scheduler 509 may decide to e.g. examine priority of DL transmission and compare priority with UL transmission. It may e.g. then decide to transmit in the DL with a reduced signal quality to reduce the interference impact on the UL transmission, or at least limit the transmitted power on an interfering frequency band or only schedule common channels in DL. If the analysis device 513 reports that many PIMC resources are available, the scheduler may decide to still schedule this SINR limited UE and invoke PIMC resources to cancel PIM in the UL signal.

As a more specific example referring to FIG. 5, at $t_1$, the MAC scheduler 509 receives a scheduling request from 501 $UE_A$, and scheduling information from the 501 $UE_A$. The scheduler sends an interference scenario report request to the analysis device to update its view on the interference scenario. The analysis device 513 replies with a report about the current PIM situation, e.g. which frequencies that are potential interfering frequencies etc. The scheduler may store this report for future scheduling to reduce request/report rate. The scheduler grants resources for the DL on this frequency $f_1$.

In a following time-interval ($t_2$), the scheduler is updated on scheduling information for the $UE_A$ 501 as well as about interference scenario e.g. $UE_B$ with interfering frequency band $f_2$. The MAC scheduler 509 also requests the PIM cancellation device in the analysis device 513 about cancellation resources. In case the MAC scheduler 509 has reserved resources (e.g. all or a predetermined share) in the PIM cancellation device it can determine the remaining cancellation resources for the TTI. It may e.g. receive a high cancelling resource availability. With this information, the MAC scheduler decides to grant $UE_A$ 501 with its scheduling request. It also grants the DL of the interfering frequency band ($f_2$) full use of resources. The following transmit time interval TTI $t_3$, follow the same procedure (with frequency $f_3$ this time). However, in $t_3$ the analysis device 513 has lack of resources and hence reports a low cancelling resource availability status. The scheduler can therefore not grant full DL utilization for the DL transmission in f3, but only schedule common channels. The MAC scheduler 509 may also determine how to best place DL traffic to get as good UL traffic as possible. It may for example decide to regenerate specific DL physical layer resources e.g. Physical Resource Blocks (PRBs).

Figure 6A:
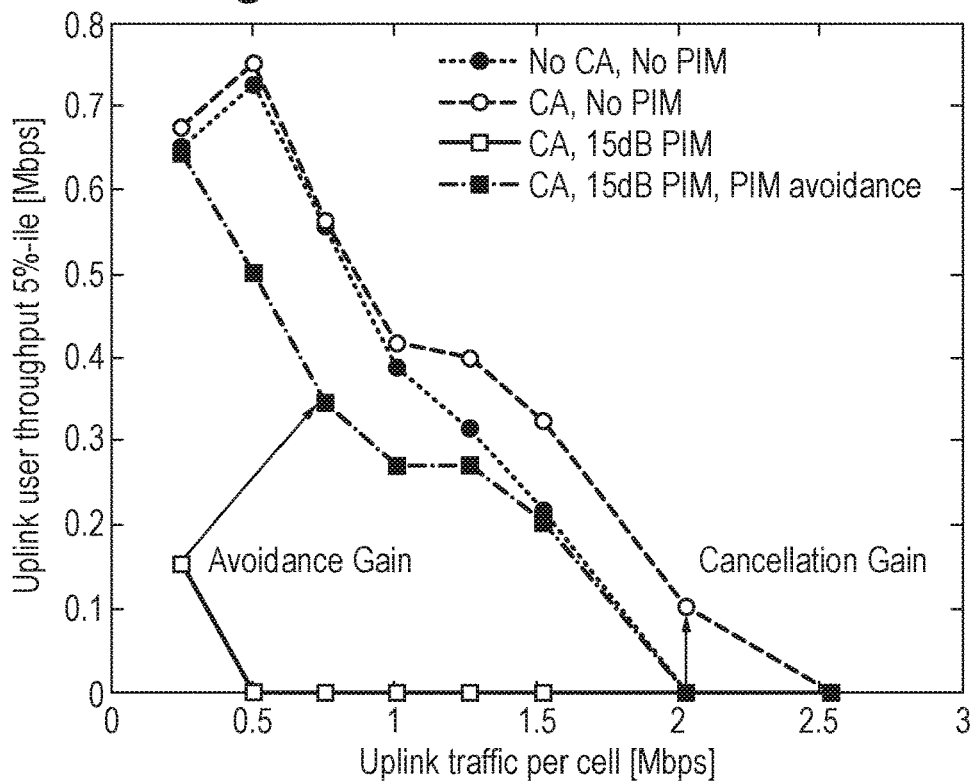
FIG. 6a and FIG. 6b are diagrams illustrating uplink and downlink system performance according to embodiments.

In FIG. 6a, the impact of the present disclosure on uplink system performance is demonstrated according to an embodiment. Uplink traffic per cell is shown on the horizontal x-axis and the 5%-ile Uplink user throughput is shown on the vertical y-axis.

Figure 6B:
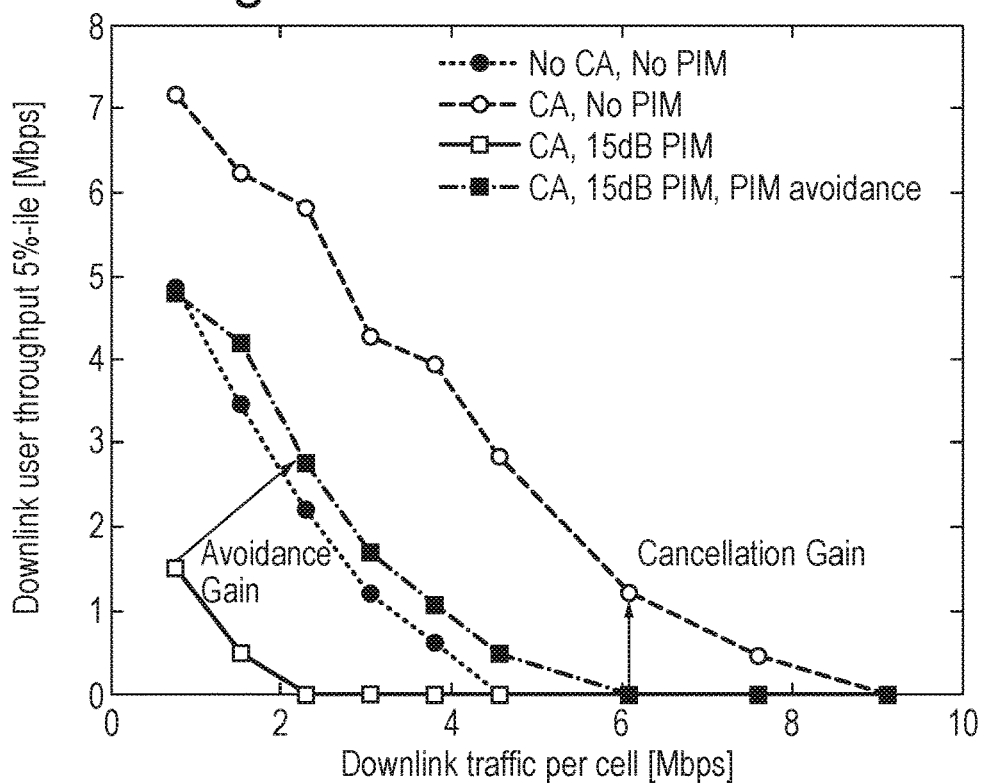

In FIG. 6b, a corresponding graph as in FIG. 6a but for the downlink system according to an embodiment. DL traffic per cell is shown on the horizontal x-axis in Mbps (megabits per second). The 5%-ile Downlink user throughput is shown on the vertical y-axis in Mbps.

In these graphs, a dotted line with black filled circles describes the situation with no carrier aggregation (CA) and no PIM. Carrier aggregation herein means that there are transmissions on two DL carriers.

A second line, shown as a dashed line with white circles describes when there is CA but no disturbing PIM. A third line shown as a line with white squares describes the situation when having CA and 15 dB PIM disturbing the UE. A fourth line shown as a dashed-dotted line with black filled squares describes when there is CA and 15 dB PIM, but where a PIM avoidance scheme is applied to avoid the PIM.

Typically, at low DL & UL traffic load (traffic per cell), around 0.25-1.5 Mbps for the UL and around 1-4 Mbps for the DL, the performance throughput is improved by using an avoidance strategy and thus moving resources from bad areas of the frequency band to better areas, which is areas with less likelihood of being disturbed by PIM in the frequency band, particularly for cell edge (5%-ile) UL & DL throughput. This improvement is realized by comparing the third line (the line with white squares) with the fourth line (the dashed-dotted line with black filled squares).

At high DL & UL traffic load, e.g. 2 Mbps in the UL and 6 Mbps in the DL, the user throughput can be improved, by using interference cancellation. It may be difficult to move the resources to other positions on the frequency band since it is high traffic load and thus cancellation improves the performance. This improvement is realized by comparing the fourth line (the dashed-dotted line with black filled squares) with the second line (the dashed line with white circles).

Thus, controlling PIM regeneration resources from the network node by a scheduler provides an efficient use of resources. The present disclosure describes how coordinated cancellation can utilize limited cancellation resources to maximize both coverage and system throughput.

Figure 7:
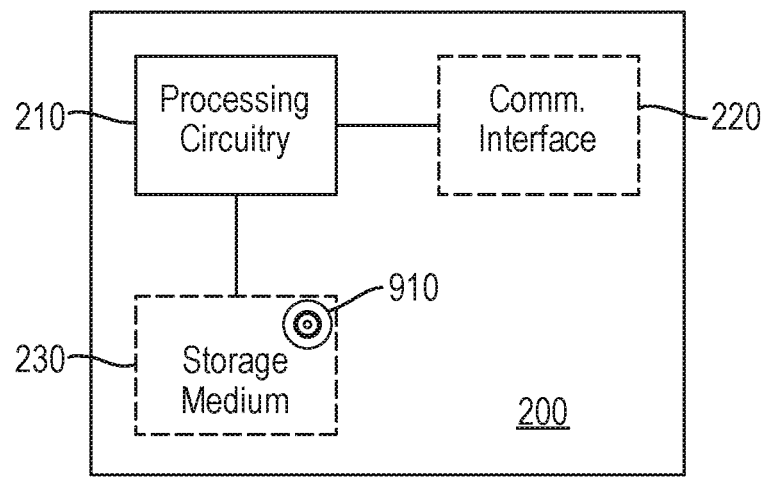
FIG. 7 is a schematic diagram showing functional units of a control device according to an embodiment.

FIG. 7 schematically illustrates, in terms of a number of functional units, the components of a control device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions.

Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

Figure 8:
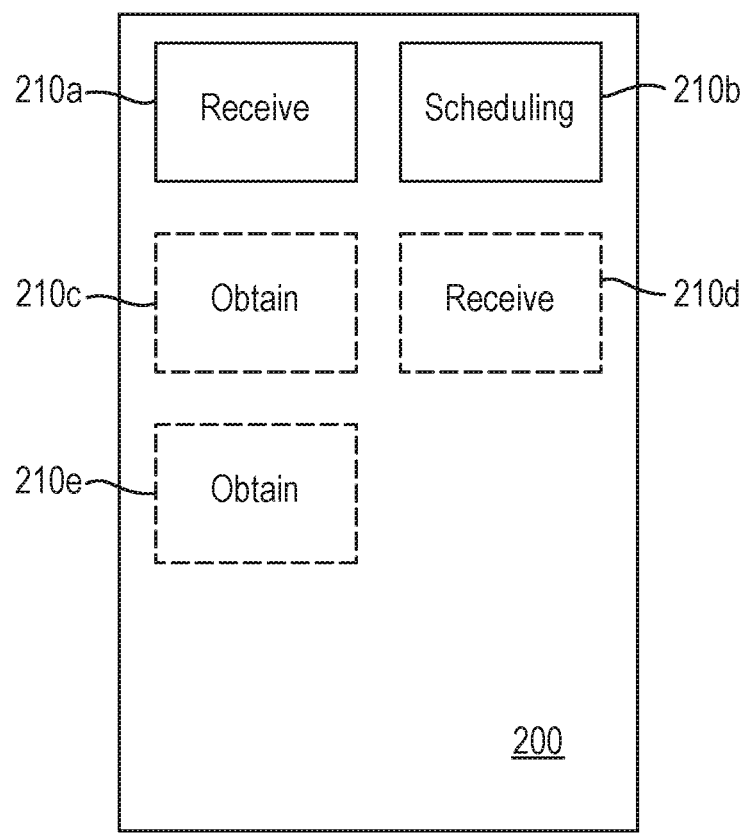
FIG. 8 is a schematic diagram showing functional modules of a control device according to an embodiment.

FIG. 8 schematically illustrates, in terms of a number of functional modules, the components of a control device 200 according to an embodiment. The control device 200 of FIG. 8 comprises some functional modules as a receive module 210a configured to perform step S101, S201 and a scheduling module 210b configured to perform step S102, S205. The control device 200 of FIG. 8 may further comprise a number of optional functional modules, such as any of a obtain module 210c configured to perform step S202, a receive module 210d configured to perform step S203, a obtain module 210e configured to perform step S204.

In general terms, each functional module 210a-210e may in one embodiment be implemented only in hardware and in another embodiment with the help of software, i.e., the latter embodiment having computer program instructions stored on the storage medium 230 which when run on the processing circuitry makes the control device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-21e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The control device 200 may be provided as a standalone device or as a part of at least one further device. For example, the control device 200 may be provided in a node of the radio access network or in a node of the core network. Alternatively, functionality of the control device 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the control device 200 may reside in the radio access network, such as in the radio access network node, for cases when embodiments as disclosed herein are performed in real time.

Thus, a first portion of the instructions performed by the control device 200 may be executed in a first device, and a second portion of the of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 7 the processing circuitry 210 may be distributed among a plurality of devices, or nodes. The same applies to the functional modules 210a-210e of FIG. 8 and the computer program 920 of FIG. 9 (see below).

Figure 9:
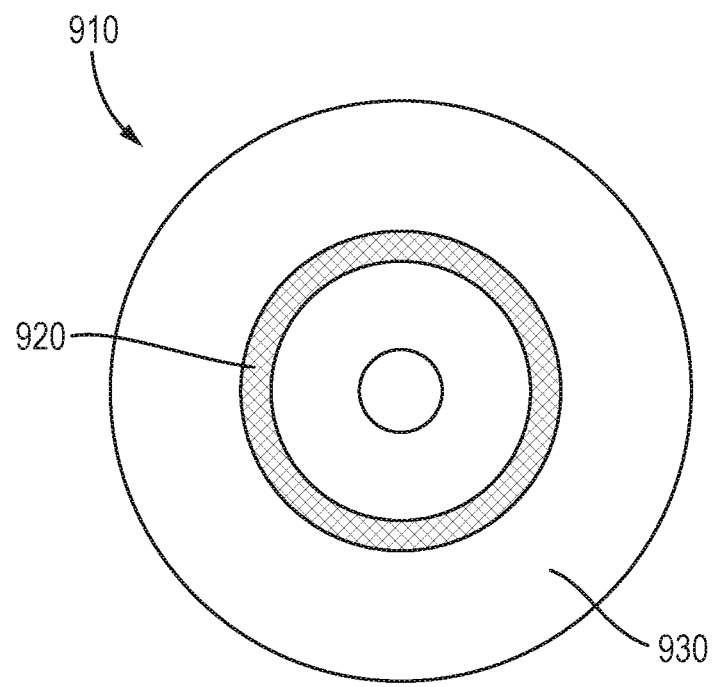
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

The invention claimed is:

1. A method for controlling interference in a received signal when scheduling in a network node for wireless communication with a set of user equipment, UEs, said set comprising a first UE and at least a second UE, wherein the interference is passive-intermodulation interference, PIM, the method comprising:
    receiving a scheduling request from at least said first UE transmitting on a first frequency, and
    scheduling at least said first UE for wireless communication based on an interference scenario report and available PIM cancellation, PIMC, resources to enable efficient PIM control,
    wherein the PIMC resources are requested from a PIMC pool if the interference scenario report comprises an indication that a predicted downlink, DL, generated PIM interference in uplink, UL, is prohibiting the first UE during UL transmission to reach a sufficient signal quality level according to its Quality of Service, QoS requirements.

2. The method according to claim 1, wherein the interference scenario report comprises information of interference impacting at least one planned coinciding UL transmission of at least said first UE.

3. The method according to claim 2, wherein if there is interference caused by at least one downlink, DL transmission impacting the at least one coinciding UL transmission and if cancellation resources are available,
    allocating cancellation resources for said UL transmission; or if there are no cancellation resources available,
    examining a priority of the least one DL transmission and the at least one UL transmission.

4. The method according to claim 3, wherein if there are no cancellation resources available and if the priority of the at least one DL transmission is higher than the at least one UL transmission, scheduling DL transmissions.

5. The method according to claim 3, wherein if there are no cancellation resources available and if the priority of the at least one DL transmission is lower than the at least one UL transmission:
   postponing the DL transmission; or
   transmitting information in the DL with a reduced quality to reduce the interference impact on the UL transmission.

6. The method according to claim 2, wherein interference impacting the at least one planned coinciding UL is caused by transmitting in the DL to at least a second UE transmitting on a second frequency band.

7. The method according to claim 1, wherein the predicted DL generated PIM interference in the UL is based on a measured PIM interference level in previously transmitted time intervals, TTIs.

8. The method according to claim 1, wherein the predicted DL generated PIM interference in the UL is based on a predicted DL signal power level and previously measured PIM at similar power levels, where the predicted DL signal power level is based on information on pending transmissions from the DL user plane.

9. The method according to claim 1, wherein scheduling the at least one UE is further based on scheduling information received from the at least first UE.

10. The method according to claim 1, wherein the interference scenario is obtained by transmitting a first request to an analysis device for the interference scenario report and receiving the interference scenario report from said analysis device.

11. The method according to claim 10, wherein available PIM cancellation resources are obtained by transmitting a second request to a PIM cancellation device about available interference cancellation resources and receiving information from said PIM cancellation device about available interference cancellation resources.

12. A control device for controlling interference in a received signal when scheduling in a network node for wireless communication with a set of user equipment, UEs, said set comprising a first UE and at least a second UE, wherein the interference is passive-intermodulation interference, PIM, the control device comprising processing circuitry being configured to cause the control device to:
   receive a scheduling request from said first UE transmitting on a first frequency; and
   schedule at least said first UE for wireless communication based on an interference scenario report and available PIM cancellation, PIMC, resources to enable efficient PIM control,
   wherein the PIMC resources are requested from a PIMC pool if the interference scenario report comprises an indication that a predicted downlink, DL, generated PIM interference in uplink, UL, is prohibiting the first UE during UL transmission to reach a sufficient signal quality level according to its Quality of Service, QoS requirements.

13. An analysis device for reporting an interference scenario, wherein the interference is passive-intermodulation interference, PIM, the analysis device comprising processing circuitry, the processing circuitry being configured to cause the analysis device to:
   receive a first request for an interference scenario report;
   analyze the interference scenario, wherein the interference scenario comprises at least an interfering frequency from communication with at least a first user equipment, UE;
   transmit the interference scenario report;
   receive a second request about available cancellation resources for PIM cancellation; and
   transmit information about available cancellation resources.

14. A non-transitory computer readable medium comprising a computer program for controlling interference in a network node for wireless communication with a set of user equipment, UEs, said set comprising a first UE and at least a second UE, wherein the interference is passive-intermodulation interference, PIM, the computer program comprising computer code which, when run on processing circuitry of a control device, causes the control device to:
   receive a scheduling request from said first UE for wireless communication transmitting on a first frequency; and
   schedule said at least first UE based on an interference scenario report and available PIM cancellation, PIMC, resources to enable efficient PIM control,
   wherein the PIMC resources are requested from a PIMC pool if the interference scenario report comprises an indication that a predicted downlink, DL, generated PIM interference in uplink, UL, is prohibiting the first UE during UL transmission to reach a sufficient signal quality level according to its Quality of Service, QoS requirements.

* * * * *